United States Patent
Kamimura et al.

(10) Patent No.: US 11,760,421 B2
(45) Date of Patent: Sep. 19, 2023

(54) VEHICLE BODY

(71) Applicants: TOYOTA JIDOSHA KABUSHIKI KAISHA, Aichi-ken (JP); SUBARU CORPORATION, Tokyo (JP)

(72) Inventors: Shinya Kamimura, Toyota (JP);
Tomoaki Mizusaki, Nagoya (JP);
Tatsunari Imazato, Tokyo (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 40 days.

(21) Appl. No.: 17/715,036

(22) Filed: Apr. 7, 2022

(65) Prior Publication Data
US 2022/0324517 A1 Oct. 13, 2022

(30) Foreign Application Priority Data

Apr. 9, 2021 (JP) ................................. 2021-066339

(51) Int. Cl.
*B62D 25/06* (2006.01)
*B62D 25/08* (2006.01)
(Continued)

(52) U.S. Cl.
CPC ........... *B62D 25/06* (2013.01); *B62D 25/087* (2013.01); *E05D 3/127* (2013.01); *B60J 5/101* (2013.01);
(Continued)

(58) Field of Classification Search
CPC ........ B62D 25/00; B62D 25/06; B62D 25/08; B62D 25/087; B62D 25/10; B62D 25/12; B60J 5/00; B60J 5/10; B60J 5/101; B60J 5/107; B60J 5/1642; B60J 7/1642; E05D 3/00; E05D 3/02; E05D 3/127; E05Y 2900/532; E05Y 2900/546; E05Y 2900/548; B60Y 2306/01
(Continued)

(56) References Cited

U.S. PATENT DOCUMENTS

| 4,085,966 | A | * | 4/1978 | Ringe | ..................... | B60J 10/86 |
| | | | | | | 49/495.1 |
| 8,336,914 | B2 | * | 12/2012 | Ito | .......................... | B60R 22/24 |
| | | | | | | 280/801.1 |
| 2012/0272580 | A1 | * | 11/2012 | Iwano | ..................... | B60J 5/101 |
| | | | | | | 49/399 |

FOREIGN PATENT DOCUMENTS

| JP | 2011-5912 A | 1/2011 |
| JP | 2018-90069 A | 6/2018 |

* cited by examiner

*Primary Examiner* — Dennis H Pedder
*Assistant Examiner* — Joyce Eileen Hill
(74) *Attorney, Agent, or Firm* — HAUPTMAN HAM, LLP

(57) ABSTRACT

A vehicle body includes a rear opening and a rear header. The rear header includes a first and a second rear header panel. A closed cross-section space is defined by the first and the second rear header panels. The vehicle body includes a reinforcing member that is disposed in the closed cross-section space. The first and the second rear header panels each include a first portion extending downward in the vehicle up-down direction and a second portion bending from a lower end of the first portion and extending rearward in the vehicle front-rear direction. The reinforcing member is disposed in a region in which the first portion of the first rear header panel and the first portion of the second rear header panel face each other. A space is provided between a lower face of the reinforcing member and the second portion of the first rear header panel.

6 Claims, 3 Drawing Sheets

(51) Int. Cl.
*E05D 3/12* (2006.01)
*B60J 5/10* (2006.01)
(52) U.S. Cl.
CPC ............ *B60J 5/107* (2013.01); *B60Y 2306/01* (2013.01); *B62D 25/08* (2013.01); *E05Y 2900/532* (2013.01); *E05Y 2900/546* (2013.01)
(58) Field of Classification Search
USPC ............ 296/219, 203.04, 202, 210, 56, 106, 296/146.8, 29, 30, 187.02; 49/104
See application file for complete search history.

VEHICLE BODY

CROSS-REFERENCE TO RELATED APPLICATION

This application claims priority to Japanese Patent Application No. 2021-066339 filed on Apr. 9, 2021, incorporated herein by reference in its entirety.

BACKGROUND

1. Technical Field

The technology disclosed in the present specification relates to a vehicle body.

2. Description of Related Art

Japanese Unexamined Patent Application Publication No. 2018-90069 (JP 2018-90069 A) discloses a structure of a rear header disposed at a rear end portion of a roof. A hatch hinge is attached to the rear header. In the rear header, a closed cross-section space is formed by an integrated arrangement of a header upper panel and a header lower panel. The rigidity of the rear header is increased by disposing a foamed material in the closed cross-section space. The strength of attaching the hatch can be improved.

SUMMARY

In the structure of the rear header according to JP 2018-90069 A, the foamed material is disposed throughout the entire closed cross-section space. There is room for improvement from the perspective of occupant protection.

A vehicle body according to one aspect of the present specification includes a rear opening. The vehicle body includes a rear header that extends in a vehicle width direction along an upper edge of the rear opening. The rear header is provided with a first rear header panel made of metal, and a second rear header panel made of metal and disposed on a vehicle outer side with respect to the first rear header panel. A closed cross-section space is defined by the first rear header panel and the second rear header panel. The vehicle body includes a hatch hinge disposed on the rear header. The vehicle body includes a reinforcing member that is disposed in the closed cross-section space and is provided with a porous portion. The first and second rear header panels each include a first portion extending downward in a vehicle up-down direction and a second portion bending from a lower end of the first portion and extending rearward in a vehicle front-rear direction. A hatch hinge is disposed on the second portion of the second rear header panel. The reinforcing member is disposed in a region in which the first portion of the first rear header panel and the first portion of the second rear header panel face each other. A space is provided, or a filler with a strength lower than a strength of the reinforcing member is disposed, between a lower face of the reinforcing member and the second portion of the first rear header panel.

In the vehicle body disclosed in the present specification, a space is provided, or a filler with a strength lower than that of the foamed material is disposed, between a lower face of the foamed material and the second portion of the first rear header panel. Accordingly, when impacting within the vehicle cabin, the first rear header panel is easily deformed and absorbs energy in the space or the region in which the filler is disposed. The function of protecting occupants can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
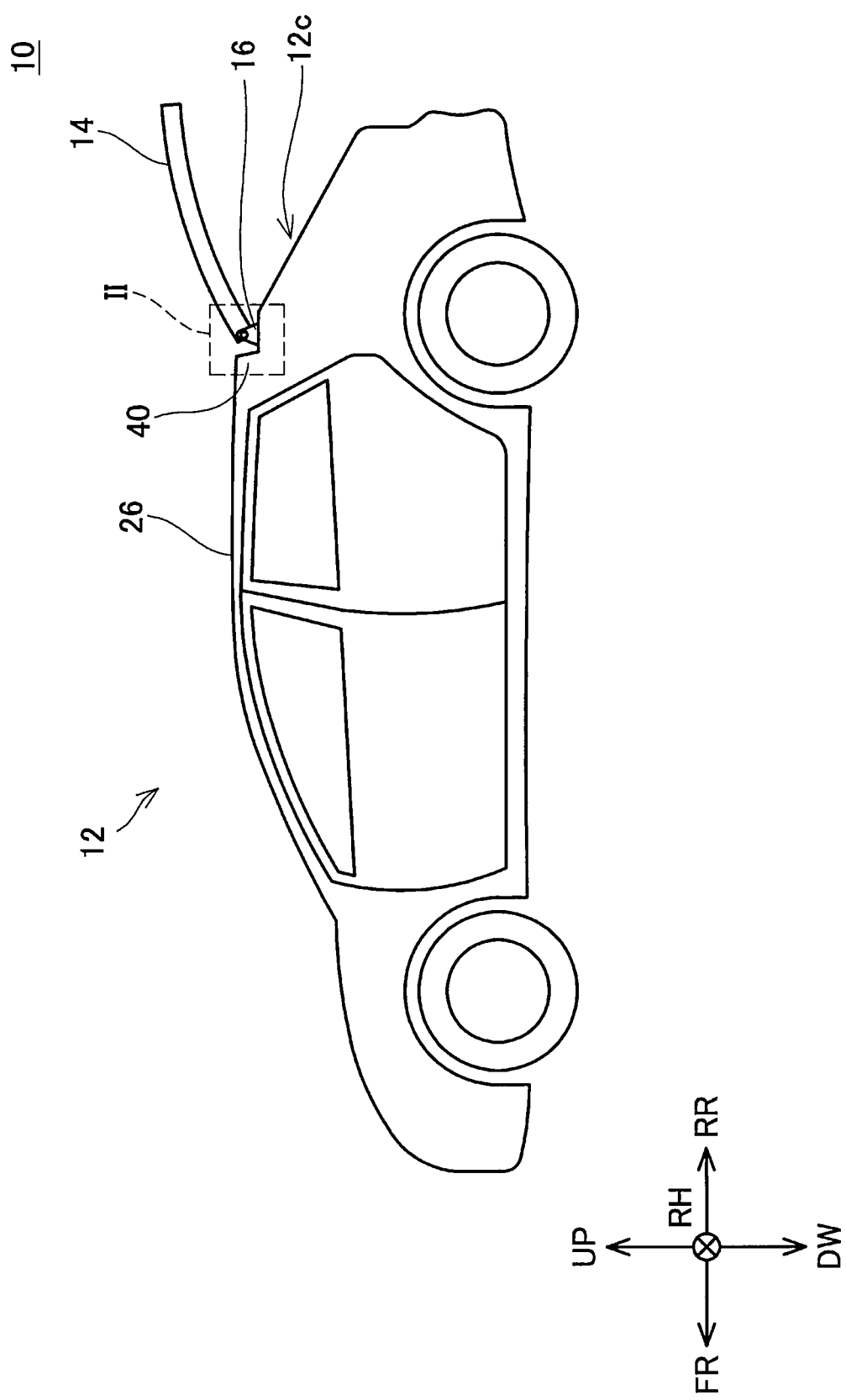
FIG. 1 is a side view of a vehicle 10.

In a vehicle body, a reinforcing member may include a first region that is located in a region in which a first portion of a first rear header panel and a first portion of a second rear header panel face each other. The reinforcing member may include a second region extending from a lower end of the first region rearward in the vehicle front-rear direction. The second region may be located in a region in which a second portion of the first rear header panel and a second portion of the second rear header panel face each other. The reinforcing member and the second portion of the second rear header panel may be configured to be in contact with each other in the second region. According to such a configuration, downward displacement of the second portion of the second rear header panel can be regulated by the second region of the reinforcing member. The strength of an attaching portion of a hatch hinge can be increased.

In the vehicle body, the reinforcing member may further include a frame member that is disposed in a vicinity of a boundary face between the reinforcing member and the first portion of the first rear header panel, and is disposed on a lower face of the reinforcing member in the second region. The frame member may be made of a non-porous material. According to such a configuration, the frame member can suppress a porous portion from intruding to the lower face side of the reinforcing member.

In the vehicle body, the frame member may include a clip in a region facing the first portion of the first rear header panel. The first portion of the first rear header panel may include a hole portion. The clip may be configured to engage the hole portion. With such a configuration, engagement of the clip and the hole portion enables accurate positioning of the reinforcing member.

In the vehicle body, the lower face of the reinforcing member may be regulated by the frame member.

The vehicle body may further include a resin trim disposed downward from the second portion of the first rear header panel. A space may be provided between the second portion of the first rear header panel and the trim.

Now, a direction FR in the drawings indicates forward in a front-rear direction of a vehicle 10, and a direction RR indicates rearward in the front-rear direction of the vehicle 10. Also, a direction LH indicates leftward in a right-left direction (or width direction) of the vehicle 10, and a direction RH indicates rightward in the right-left direction of the vehicle 10. Further, a direction UP indicates upward in an up-down direction of the vehicle 10, and a direction DW indicates downward in the up-down direction of the vehicle 10. Note that in the present specification, the front-rear direction of the vehicle 10, the right-left direction of the vehicle 10, and the up-down direction of the vehicle 10 may be referred to simply as the front-rear direction, the right-left direction, and the up-down direction, respectively.

FIG. 1 is a side view of the vehicle 10 according to an embodiment. As illustrated in FIG. 1, the vehicle 10 includes a vehicle body 12 and a hatch 14. A hatch opening 12c (rear opening) that opens rearward is provided at a rear portion of the vehicle body 12. A rear header 40 is disposed at a rear end of the roof panel 26. The hatch 14 is attached to the rear header 40 via a right-left pair of hinges 16. FIG. 1 illustrates a state in which the hatch 14 is lifted up.

Figure 2:
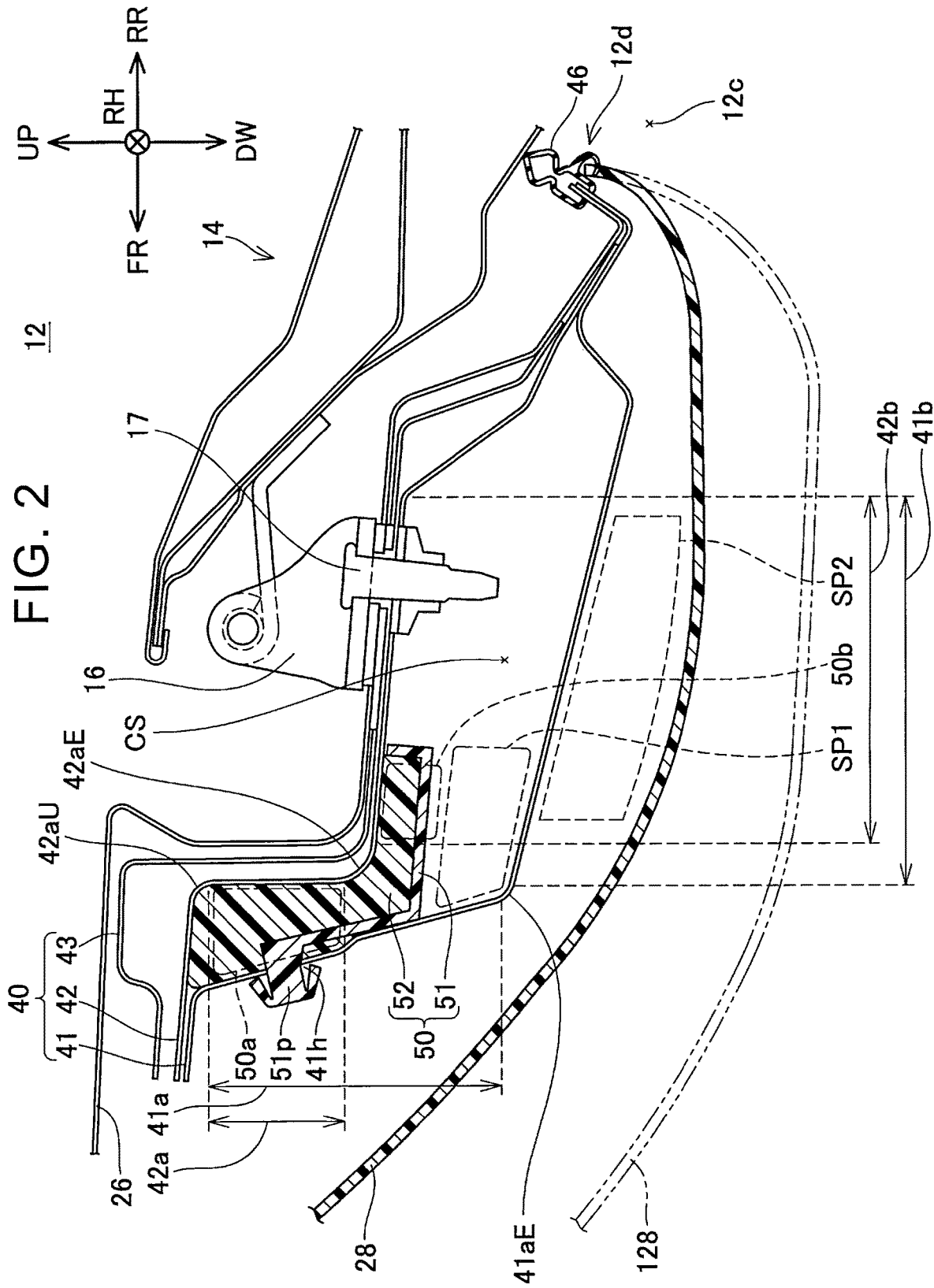
FIG. 2 is a cross-sectional view of a vehicle body taken along plane II in FIG. 1.

FIG. 2 is a cross-sectional view of the vehicle body 12 taken along plane II in FIG. 1. Plane II is a plane that passes through the hinge 16 at a right-side side portion of the vehicle body 12. FIG. 2 illustrates a state in which the hatch 14 is closed. The vehicle body 12 according to the present embodiment has a bilaterally symmetrical shape, and accordingly only the right-side side portion of the vehicle body 12 will be described below. The vehicle body 12 includes the roof panel 26, the rear header 40, the hinge 16, a reinforcing member 50, and a roof trim 28.

The roof panel 26 is located on the outer side within the vehicle body 12 and extends forward from an upper edge 12d of the hatch opening 12c. The roof panel 26 covers the rear header 40. The roof panel 26 is joined to a first rear header panel 41 at the upper edge 12d of the hatch opening 12c.

The rear header 40 extends in a vehicle width direction along the upper edge of the hatch opening 12c. The rear header 40 includes first to third rear header panels 41 to 43. The first to third rear header panels 41 to 43 are made of metal, and for example, are made of a steel plate or an aluminum plate. The first to third rear header panels 41 to 43 are disposed so as to be overlapped toward the outside of the vehicle, in this order. A closed cross-section space CS is formed by the first rear header panel 41 and the second rear header panel 42.

The first rear header panel 41 includes a first portion 41a and a second portion 41b. The first portion 41a is a portion extending downward in the vehicle. The second portion 41b is a portion that bends from a lower end 41aE of the first portion 41a and extends rearward in the vehicle. In the same way, the second rear header panel 42 includes a first portion 42a and a second portion 42b. The first portion 42a is a portion extending downward in the vehicle. The second portion 42b is a portion that bends from a lower end 42aE of the first portion 42a and extends rearward in the vehicle. The first portions 41a and 42a form vertical walls, and thus torsional rigidity of the vehicle body 12 can be improved.

The reinforcing member 50 includes a frame member 51 and a porous portion 52. The porous portion 52 is a main component of the reinforcing member 50. The porous portion 52 is made of foam that is foamed by heating. A known foam material capable of exhibiting high rigidity can be used as appropriate for the foam. Examples of the foam include foamed rubbers and foamed plastics, and in particular include rigid polyurethane foam, polystyrene foam, polyethylene foam, polypropylene foam, ethylene-vinyl acetate (EVA) crosslinked foam, polyethylene terephthalate (PET) resin foam, phenol foam, silicone foam, polyvinyl chloride foam, urea foam, acrylic foam, polyimide foam, ethylene propylene diene monomer (EPDM) foam, and so forth, although not limited thereto in particular.

The frame member 51 is disposed in the vicinity of a boundary face between the reinforcing member 50 and the first portion 41a of the first rear header panel 41, and on the lower face of the reinforcing member 50 in a second region 50b described below. The frame member is made of a non-porous material. Examples of the non-porous material can include metals, ceramics, plastics, and so forth, as appropriate, although not limited thereto in particular. Examples of plastics that can be used include epoxy resin, urethane resin, and so forth. The frame member 51 supports the porous portion 52 before and after foaming. In addition to serving as a support, the frame member 51 can also contribute to improving the rigidity of the reinforcing member 50.

The frame member 51 includes a clip 51p in a region facing the first portion 41a of the first rear header panel 41. The first portion 41a of the first rear header panel 41 includes a hole portion 41h. The clip 51p engages the hole portion 41h.

The reinforcing member 50 is disposed in the closed cross-section space CS. The reinforcing member 50 includes a first region 50a and the second region 50b. The first region 50a is a region located in a region in which the first portion 41a of the first rear header panel 41 and the first portion 42a of the second rear header panel 42 face each other. The second region 50b is a region extending rearward in the vehicle from the lower end of the first region 50a. The second region 50b is a region located in a region in which the second portion 41b of the first rear header panel 41 and the second portion 42b of the second rear header panel 42 face each other.

In the second region 50b, an upper face of the reinforcing member 50 is in contact with the second portion 42b of the second rear header panel 42. Further, there is a first space SP1 between the lower face of the reinforcing member 50 and the second portion 42b of the first rear header panel 41.

The roof trim 28 is a member made of resin. The roof trim 28 is a member that defines height dimensions within a vehicle cabin. The roof trim 28 is disposed downward from the second portion 41b of the first rear header panel 41. A rear end of the roof trim 28 is attached to the upper edge 12d of the hatch opening 12c via a weather strip 46. There is a second space SP2 between the second portion 41b of the first rear header panel 41 and the roof trim 28.

The hinge 16 is fixed by bolts 17 to a region in which the second portion 42b of the second rear header panel 42 is disposed. The hatch 14 is fixed to the hinge 16. Description of the configuration of the hatch 14 will be omitted.

Structure and Attaching Process of Reinforcing Member 50

Figure 3:
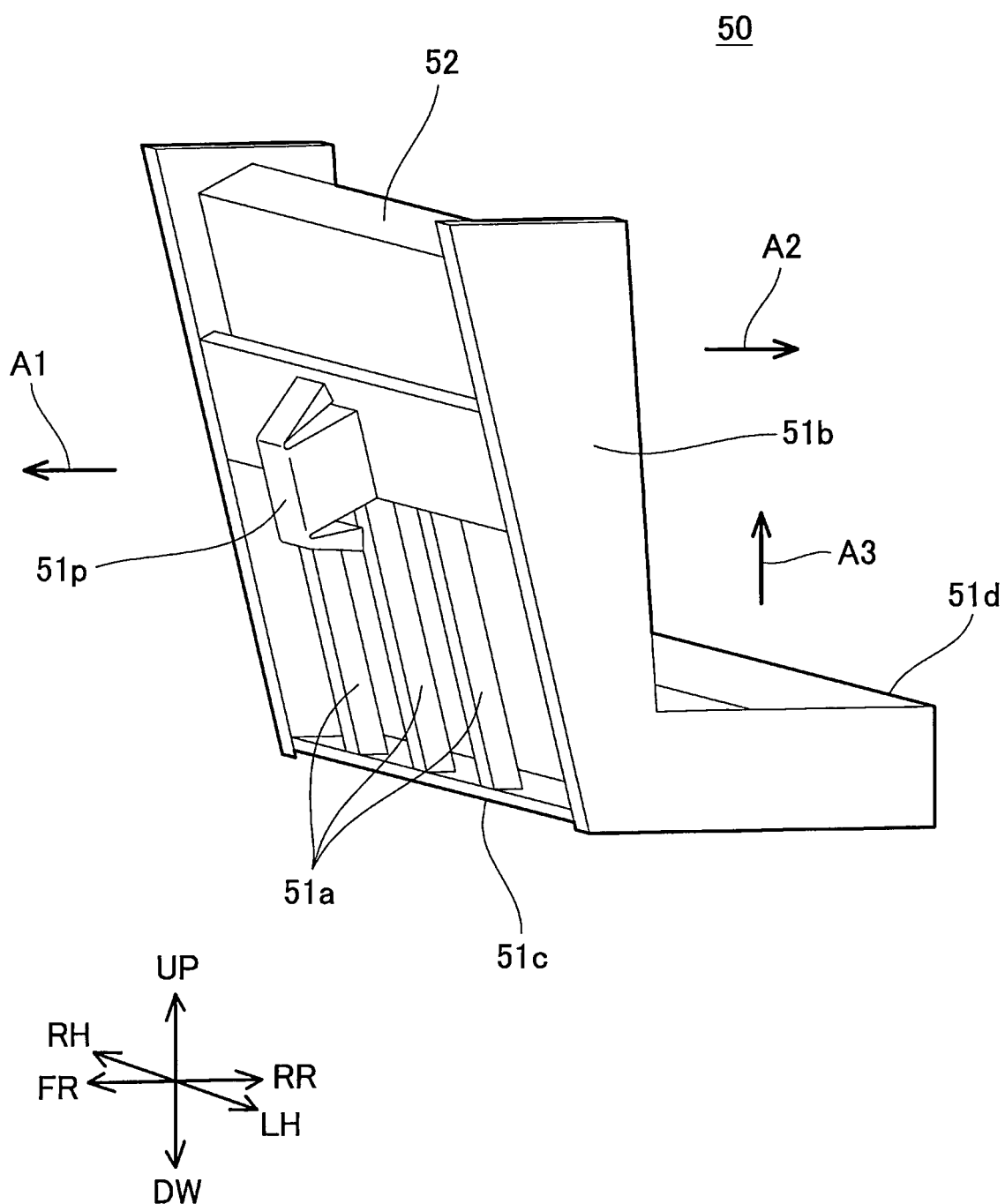
FIG. 3 is a perspective view of a reinforcing member 50.

FIG. 3 is a perspective view of the reinforcing member 50. The reinforcing member 50 includes the frame member 51 and the porous portion 52. In FIG. 3, the porous portion 52 is in a state before foaming. The frame member 51 includes outer frame portions 51a to 51d. The outer frame portions 51a to 51d attach and hold the porous portion 52 prior to foaming at a predetermined position, and contribute to improvement of rigidity of the reinforcing member 50. The outer frame portion 51a includes slits. Accordingly, the porous portion 52 can bulge in the direction of the first portion 41a of the first rear header panel 41 (arrow A1). On the other hand, the outer frame portions 51b to 51d do not include slits, and accordingly function as wall portions that regulate bulging.

The process of attaching the reinforcing member 50 will be described. First, the clip 51p engages the hole portion 41h of the first rear header panel 41. Accordingly, the reinforcing member 50 can be accurately fixed in the predetermined position thereof. After attaching the second rear header panel 42, the portion at which the reinforcing member 50 is disposed is heated, either during or following assembly of the rear header 40. The porous portion 52 can be foamed within the rear header 40.

Due to the foaming, the porous portion 52 bulges in the direction of arrow A1 and is joined to the first portion 41*a* of the first rear header panel 41. Further, the porous portion 52 bulges in the directions of arrows A2 and A3, and is joined to each of the first portion 42*a* and the second portion 42*b* of the second rear header panel 42. On the other hand, the lower face of the reinforcing member 50 is regulated by the outer frame portion 51*c*, and accordingly the porous portion 52 does not bulge downward. Accordingly, the first space SP1 can be maintained even after foaming, as illustrated in FIG. 2. Further, bulging of the reinforcing member 50 in the vehicle width direction can be regulated by the outer frame portion 51*b*.

Effects

The load of the hatch 14 is applied to the second portion 42*b* of the second rear header panel 42 to which the hinge 16 is attached. Accordingly, there are cases in which the first portion 42*a* vibrates in the front-rear direction, with an upper end 42*a*U of the first portion 42*a* of the second rear header panel 42 as a fulcrum. Also, there are cases in which the second portion 42*b* of the second rear header panel 42 vibrates in the up-down direction with the lower end 42*a*E as a fulcrum. In the technology according to the present embodiment, the region in which the first portions 41*a* and 42*a* face each other in the closed cross-section space CS is filled with the reinforcing member 50. The rigidity of the closed cross section of the first region 50*a* can be improved, and accordingly, vibration of the first portion 42*a* in the front-rear direction can be suppressed. Further, the lower face of the second portion 42*b* of the second rear header panel 42 can be supported by the reinforcing member 50 over the region extending from the lower end 42*a*E rearward in the vehicle. The rigidity of the closed cross section of the second region 50*b* can be improved, and accordingly, vibration of the second portion 42*b* in the up-down direction can be suppressed.

As a comparative example, a case in which the reinforcing member 50 fills in the first space SP1 as well will be described. In this case, the first rear header panel 41 is not easily deformed when the lower face of the first rear header panel 41 is impacted within the vehicle cabin. Accordingly, in order to ensure safety within the vehicle cabin in a collision, it is necessary to move the position of the roof trim into the vehicle cabin space, as indicated by a roof trim 128 drawn by long dashed double-short dashed lines in FIG. 2. This sacrifices a space within the vehicle cabin. In the technology according to the present embodiment, the reinforcing member 50 is not disposed in the first space SP1, and the first space SP1 is hollow. Thus, when the lower face of the first rear header panel 41 is impacted within the vehicle cabin, the first rear header panel 41 is readily deformed within the first space SP1, and energy can be absorbed. Accordingly, the position of the roof trim can be positioned further toward the outside of the vehicle cabin, as illustrated by the roof trim 28 in FIG. 2. Safety within the vehicle cabin in a collision can be secured and a space within the vehicle cabin can be enlarged at the same time. In particular, when the inclination of the hatch 14 is made to be shallow, from a perspective of improving design or the like, the head clearance at the rear seats is reduced, and accordingly the technology according to the present embodiment is effective.

Although the specific examples of the technology disclosed in the present specification are described in detail above, these are only exemplary, and are not intended to limit the scope of the claims. The technology described in the claims includes various modifications and alterations of the specific examples exemplified above. The technical elements described in the present specification or illustrated in the drawings exhibit technical utility solely or in various combinations, and are not limited to the combinations described in the claims as originally filed. The technology exemplified in the present specification or in the drawings may achieve a plurality of objects at the same time, and has technical utility by achieving one of the objects.

Modifications

A filler having a strength lower than that of the porous portion 52 may be disposed in the first space SP1. This also enables the first rear header panel 41 to be easily deformed in the first space SP1 when impacting within the vehicle cabin. The filler may be, for example, a sound-absorbing wool material.

The arrangement for fixing the reinforcing member 50 to the first rear header panel 41 is not limited to the clip 51*p*, and various arrangements may be made. For example, the reinforcing member 50 may be fixed to the first rear header panel 41 using double-sided tape.

What is claimed is:

1. A vehicle body comprising:
    a rear opening;
    a rear header that extends in a vehicle width direction along an upper edge of the rear opening, the rear header being provided with a first rear header panel made of metal, and a second rear header panel made of metal and disposed on a vehicle outer side with respect to the first rear header panel, and a closed cross-section space being defined by the first rear header panel and the second rear header panel;
    a hatch hinge disposed on the rear header; and
    a reinforcing member disposed in the closed cross-section space and provided with a porous portion, wherein:
    the first rear header panel includes a first portion extending downward in a vehicle up-down direction and a second portion bending from a lower end of the first portion of the first rear header panel and extending rearward in a vehicle front-rear direction;
    the second rear header panel includes a first portion extending downward in the vehicle up-down direction and a second portion bending from a lower end of the first portion of the second rear header panel and extending rearward in the vehicle front-rear direction;
    the hatch hinge is disposed on the second portion of the second rear header panel;
    the reinforcing member is disposed in a region in which the first portion of the first rear header panel and the first portion of the second rear header panel face each other; and
    a space is provided, or a filler with a strength lower than a strength of the reinforcing member is disposed, between a lower face of the reinforcing member and the second portion of the first rear header panel.

2. The vehicle body according to claim 1, wherein:
    the reinforcing member includes
        a first region that is located in a region in which the first portion of the first rear header panel and the first portion of the second rear header panel face each other, and
        a second region extending from a lower end of the first region rearward in the vehicle front-rear direction, the second region being located in a region in which the second portion of the first rear header panel and the second portion of the second rear header panel face each other; and the reinforcing member and the second portion of the second rear header panel are configured to be in contact with each other in the second region.

3. The vehicle body according to claim 2, wherein:

the reinforcing member is further provided with a frame member that is disposed in a vicinity of a boundary face between the reinforcing member and the first portion of the first rear header panel, and is disposed on a lower face of the reinforcing member in the second region; and the frame member is made of a non-porous material.

4. The vehicle body according to claim 3, wherein:

the frame member is provided with a clip in a region facing the first portion of the first rear header panel;

the first portion of the first rear header panel is provided with a hole portion; and the clip is configured to engage the hole portion.

5. The vehicle body according to claim 3, wherein the lower face of the reinforcing member is regulated by the frame member.

6. The vehicle body according to claim 1, further comprising a resin trim disposed downward from the second portion of the first rear header panel, wherein a space is provided between the second portion of the first rear header panel and the trim.

\* \* \* \* \*